United States Patent
Vu et al.

(10) Patent No.: US 11,849,402 B2
(45) Date of Patent: Dec. 19, 2023

(54) METHOD FOR MOBILE CLOSED LOOP POWER CONTROL ADAPTING TO USER DEMAND OF DATA SERVICES

(71) Applicant: VIETTEL GROUP, Ha Noi (VN)

(72) Inventors: Thi Huong Giang Vu, Ha Noi (VN); Anh Tu Nguyen, Hai Phong (VN); Van Tung Tran, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 107 days.

(21) Appl. No.: 17/511,074

(22) Filed: Oct. 26, 2021

(65) Prior Publication Data

US 2022/0132429 A1    Apr. 28, 2022

(30) Foreign Application Priority Data

Oct. 27, 2020   (VN) .............................. 1-2020-06187

(51) Int. Cl.
| | | |
|---|---|---|
| *H04W 52/08* | (2009.01) | |
| *H04W 52/24* | (2009.01) | |
| *H04W 52/60* | (2009.01) | |
| *H04W 52/36* | (2009.01) | |
| *H04W 52/10* | (2009.01) | |

(52) U.S. Cl.
CPC ........... *H04W 52/08* (2013.01); *H04W 52/10* (2013.01); *H04W 52/241* (2013.01); *H04W 52/365* (2013.01); *H04W 52/60* (2013.01)

(58) Field of Classification Search
CPC ... H04W 52/08; H04W 52/10; H04W 52/241; H04W 52/365; H04W 52/60; H04W 52/243; H04W 52/146; H04W 72/21; H04W 72/0473; H04W 72/1268; H04W 88/02; H04W 52/245; H04B 17/336; H04B 17/345; H04B 17/309
See application file for complete search history.

(56) References Cited

U.S. PATENT DOCUMENTS

| | | | | |
|---|---|---|---|---|
| 9,125,163 | B2 * | 9/2015 | Palanki | H04W 52/241 |
| 9,439,159 | B2 * | 9/2016 | Kim | H04W 52/365 |
| 10,701,717 | B2 * | 6/2020 | Yerramalli | H04W 52/365 |
| 2007/0189047 | A1 * | 8/2007 | Lee | H04W 52/243 |
| | | | | 363/62 |
| 2008/0212527 | A1 * | 9/2008 | Hosein | H04W 52/08 |
| | | | | 370/329 |
| 2011/0098076 | A1 * | 4/2011 | Kim | H04W 52/241 |
| | | | | 455/522 |
| 2011/0177837 | A1 * | 7/2011 | Chang | H04W 52/243 |
| | | | | 455/522 |
| 2011/0261731 | A1 * | 10/2011 | Lee | H04W 52/10 |
| | | | | 370/280 |
| 2013/0109432 | A1 * | 5/2013 | Yang | H04W 52/241 |
| | | | | 455/522 |

(Continued)

*Primary Examiner* — Lana N Le
(74) *Attorney, Agent, or Firm* — patenttm.us

(57) ABSTRACT

A method for uplink closed loop power control in advanced wireless systems which adaptively adjusts target signal-to-interference noise ratio (SINRtarget) in order to achieve the best uplink throughput of data services is disclosed. To derive the desired target SINR, the system collects and evaluates various uplink parameters as inputs: real-time signal-to-interference noise ratio of data physical channel, terminal power headroom, and terminal buffer data status and data service requirements.

5 Claims, 3 Drawing Sheets

(56) References Cited

U.S. PATENT DOCUMENTS

2019/0098657 A1\* 3/2019 Golitschek ............ H04W 72/21
2020/0163031 A1\* 5/2020 Loehr ................. H04W 52/146
2020/0229206 A1\* 7/2020 Badic ................ H04W 52/0209

\* cited by examiner

METHOD FOR MOBILE CLOSED LOOP POWER CONTROL ADAPTING TO USER DEMAND OF DATA SERVICES

FIELD OF INVENTION

The invention relates to Uplink power control in wireless communication system. More particularly, this disclosure determines a novel method for the Outer Loop of Closed-Loop Power Control typically deployed in 3GPP-based Long Term Evolution (LTE) or 5G NR systems.

BACKGROUND

Uplink power control is an important feature in mobile wireless communication system; which regulates the transmitted power of User Equipment (UE) to ensure quality of service requirements, reduce battery UE power consumption, decrease interference to adjacent cells, increase total cell throughput and extend coverage of Base Station (BS). Uplink power control includes two mechanisms: Open loop Power Control (OLPC) and Closed loop Power Control (CLPC).

In open loop power control, UE transmitter sets its output power to a specific value which is calculated based on static or semi-static parameters provided by BS. UE transmitted power is proportional to pathloss (the reduction in power density of an electromagnetic wave as it propagates through space) and UE's allocated frequency resources. BS sends OLPC parameters to UE through signaling messages, which cannot accommodate fast changes in radio condition; these parameters are rarely changed in each UE connecting session.

Closed loop power control (CLPC) is a dynamic mechanism implemented at BS to fine-tune UE transmitted power calculated in OLPC by sending Transmit Power Command (TPC) toward the UE. TPCs are automatically inferred from UE's current uplink quality and the desired threshold of the system. The existing CLPC mechanisms usually set the threshold to a target Signal-to-Interference Noise ratio ($SINR_{target}$), which ensures the required successful signal decoding probability.

Closed Loop Power Control comprises two loops: Inner Loop and Outer Loop of Closed-Loop Power Control (CLPC).

Inner-Loop CLPC calculates the difference between UE's uplink signal-to-interference noise ratio (SINR) and $SINR_{target}$ to decide Transmit Power Commands (TPCs) to UE. In an example of 3GPP-based LTE and NR network, TPCs are sent to UE through Downlink control information (DCI).

Outer-Loop CLPC adjusts $SINR_{target}$ by considering some input factors. Some popular factors in current Outer-loop CLPC mechanisms are: UE position in a cell, the Block Error Rate (BER) of radio channel, total received power or UE transmitted power. Those mechanism do not take into account factors related to UE's real-time service demands, such as: data rates, data volume in UE's buffer. . . . Consequently, UEs might not reach the best desired quality of services.

SUMMARY OF INVENTION

In this disclosure, the below theoretical formula (1) is considered to evaluate the Uplink data rate:

Uplink data rate (bit/second)=Spectral efficiency (bit/Hz)*bandwidth (Hz)    (1)

Where:
Spectral efficiency (bit/Hz) of UE is affected by the Adaptive Modulation and Coding Scheme (AMC). AMC is the algorithm which can use SINR as an input to choose Modulation order and code rate of the physical channel. UE can be scheduled with higher modulation order and code rate when UE's uplink SINR is good, which results in high Spectral efficiency.
To increase UE's uplink SINR, Outer-loop CLPC power control must set high $SINR_{target}$ and send TPC toward UE to achieve that target
Bandwidth resource (Hz) allocated to UE depends on UE's Power Headroom (PHR). To ensure the desired SINR, UE transmitted power increases proportionally to allocated bandwidth, which means UE must have a sufficient power reservation to satisfy their frequency resource allocation.

UE transmitted power is limited; therefore, the higher $SINR_{target}$ means that BS has to send continuous TPCs to UE to reach the target and there is less power headroom for increasing uplink frequency resources. To achieve UE's optimal uplink throughput, Outer-loop CPLC shall consider the trade-off between power distribution for spectral efficiency gain and for uplink bandwidth gain.

Classification of UE data service demand provides the mean to balance between the desired high data rates of several UEs in the cell and the reduced interference due to Uplink transmission from other UEs without high data demands.

The Closed loop power control system in this disclosure dynamically adapts $SINR_{target}$ to the classified UE data service type to achieve the optimal data rate of that service. The presented invention comprises the following functional modules:
Collection of UE's uplink parameters: power Headroom (PHR), Uplink channel quality, Buffer status report (BSR).
Calculation of the average Uplink data rate ($THP_{avg}$).
Classification of data service types: This module classifies user data services based on Uplink data rates (2 data service types: high uplink data rate and low uplink data rate service).
Determine the $SINR_{target}$: This module updates $SINR_{target}$ according to user data services types.
The two key ideas of $SINR_{target}$ determination mechanism in the invention are:
$SINR_{target}$ is customized based on real-time traffic demand of each uplink connection (denoting by data volume in UE buffer).
$SINR_{target}$ is regulated to achieve the optimal uplink throughput by balancing between power headroom for increasing SINR and power headroom for increasing allocated bandwidth. Meanwhile $SINR_{target}$ for other UEs is kept low, at the configured base value, to maintain good interference level in the cellular context.

DETAILED DESCRIPTION

Figure 1:
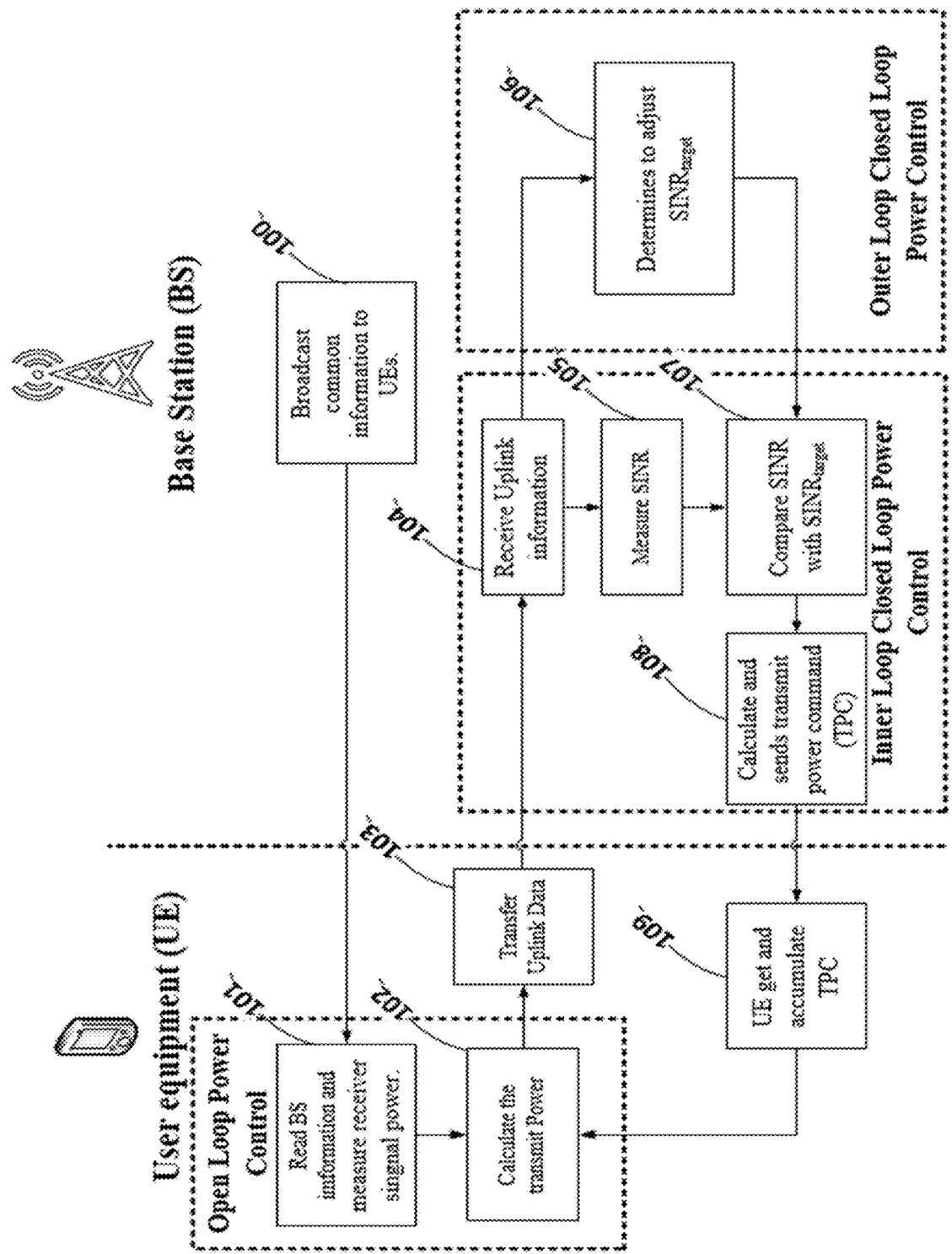
FIG. 1 illustrates a mobile wireless communication system using open loop power control and closed loop power control.

FIG. 1 shows the general functions of Uplink Power Control system, which comprises:
- 100: BS broadcasts common network information and configured parameters to UEs.
- 101: UE collect input parameters by reading BS's information and measuring received signal power.
- 102: The UE calculates a transmit power based on inputs from 101.
- 103: UE transmits uplink data.
- 104: BS receives uplink signal from UEs.
- 105: BS measures uplink SINR of signals from UE.
- 106: BS calculates and adjusts $SINR_{target}$
- 107: BS compares UE's uplink SINR with $SINR_{target}$
- 108: BS calculates and sends TPC to UEs.
- 109: UE gets and accumulates TPC.

The invention concentrates on Outer-loop CLPC which is illustrated in 106 of FIG. 1: The invention proposes a system for determining $SINR_{target}$ for each UE to meet the following requirement: all data in UE buffer is transmitted with maximum uplink data rates and minimum power correction steps (or minimum number of transmitting TPCs) corresponding to real-time UE power headroom.

Figure 2:
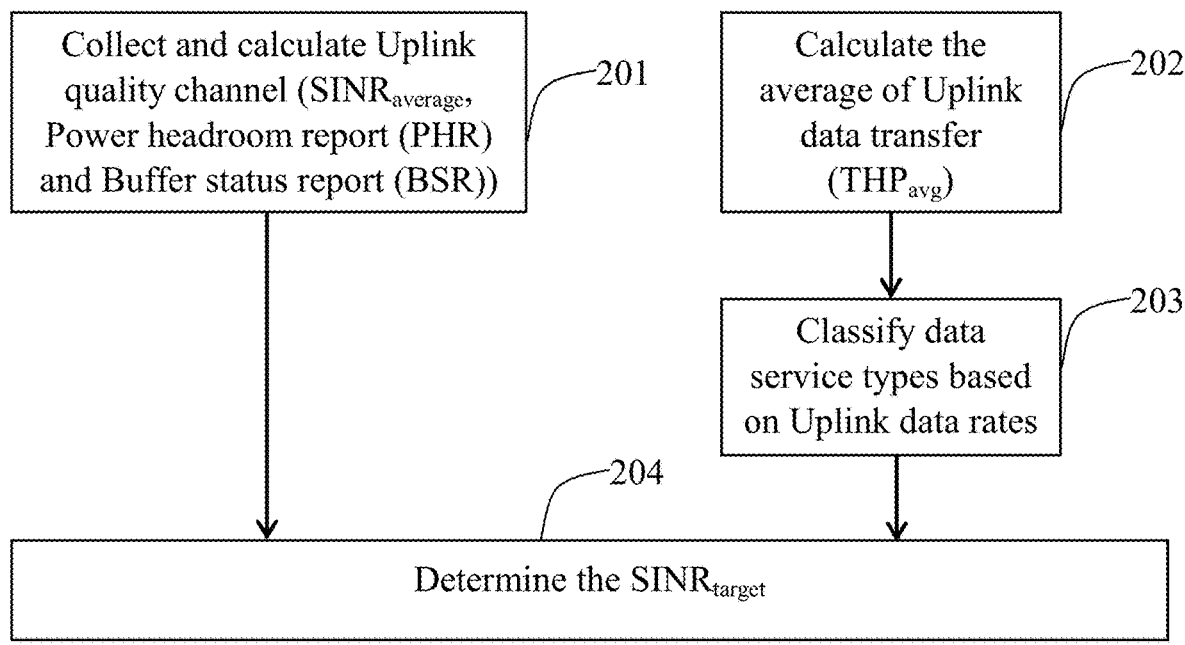
FIG. 2 illustrates the flow diagram of the present closed loop power control system of the present invention.

The details of proposed $SINR_{target}$ determining system is shown in FIG. 2:
- 201 This module collects UE uplink information from 104 module to provide inputs for 204 module. This inputs includes 3 parameters: $SINR_{average}$, Power headroom report (PHR) and Buffer status report (BSR). $SINR_{average}$, PHR and BSR are calculated as below:
  $SINR_{average}$: SINR of UE Uplink signals, which is accumulated from the initiation of the uplink connection to the calculated time, the formula is:

$$SINR_{avg}(t) = \alpha * SINR_{avg}(t-1) + (1-\alpha) * SINR_{inst}(t) \qquad (1)$$

Where:
- $SINR_{avg}(t)$: average SINR at "t" time
- $SINR_{avg}(t-1)$: average SINR at "t-1" time
- $SINR_{inst}(t)$: SINR is measured at "t" time
- $\alpha$: an adjustable coefficient.

Power headroom report (PHR) is periodically sent by the UE to the BS to indicates how much transmission power left for a UE to use in addition to the power being used by current transmission BSR: indicates how much data in UE buffer to be sent out.

The module 202 calculates the average uplink data rate ($THP_{avg}$) in a predefined periodicity, which is selected to be equal to UE's PHR periodicity. The $THP_{avg}$ is calculated by the following equation:

$$THP_{avg} = \frac{\text{Total Uplink data volumes in the recent } PHR \text{ pediod}}{\text{Time to tranfer}}$$

Where:
Time to transfer=PHR periodicity collected from FIG. 1_104.

$THP_{avg}$ calculated from 202 will be the input to 203.

The module 203 classifies user data services based on $THP_{avg}$ from 202. BS differentiates between UEs which are having the demand to increase uplink throughput and the UEs which only need to maintain connections. By doing this, not all the UEs have to increase transmitted power to the high level so it can avoid interference to UEs in adjacent BSs and decrease noise floor.

The output of this module comprises two types of UE data services:
- UEs use low data rate services (such as web service, over the top (OTT) apps, ping services and discrete uplink feedbacks for the downlink services . . . )
- UEs use high data rate services (such as video streaming, data Upload . . . )

The following module is the most important module of the invention: module 204 determines $SINR_{target}$ for each UE Uplink connection based on output from 203. The module has two processes, including:

The first process: calculating $SINR_{target}$ for UE requiring low data rate ($SINR_{discrete}$). $SINR_{discrete}$ is defined by a formula (2):

$$SINR_{discrete} = SINR_{OLPC} \qquad (2)$$

Where:
$SINR_{OLPC}$ is the average SINR when BS uses Open loop power control (OLPC). By using average $SINR_{OLPC}$ as the SINR target, BSs still ensures the required SINR for decoding UE uplink signals while minimize the number of transmitted TPCs.

The second process: calculating $SINR_{target}$ for UE requiring high data rate ($SINR_{highThp}$). The steps to calculate $SINR_{highThp}$ are:

Step 1: Collects input parameters: PHR, BSR and $SINR_{avg}$ from 201.

Step 2: Ensures $SINR_{highThp}$ to satisfy the disequations (3):

$$SINR_{min} \leq SINR_{highThp}(i) \leq SINR_{max} \qquad (3)$$

Where:
$SINR_{min}$ is minimum required SINR for BS to successfully decode UE Uplink signal.

$SINR_{max}$ is maximum SINR that can be obtained by formula $SINR_{max}=SINR_{avg}+PHR$.

Step 3: Calculate $SINR_{highThp}$ based on the following algorithm:

$SINR_{highThp}\text{init}=SINR_{min}$

Increase $SINR_{highThp}$ by $\Delta_{SINR}$ step from $SINR_{min}$ to $SINR_{max}$.

$SINR_{highThp}(i)=SINR_{highThp}(i-1)+\Delta_{SINR}$.

Where $\Delta_{SINR}$ is one SINR step to increase a step of spectral efficiency (depending on AMC algorithm).

Using PHR, bsr, $SINR_{highThp}(i)$ to estimate data rates at each step.

Finally the algorithm will choose $SINR_{highThp}$ at the step with the highest data rates.

Figure 3:
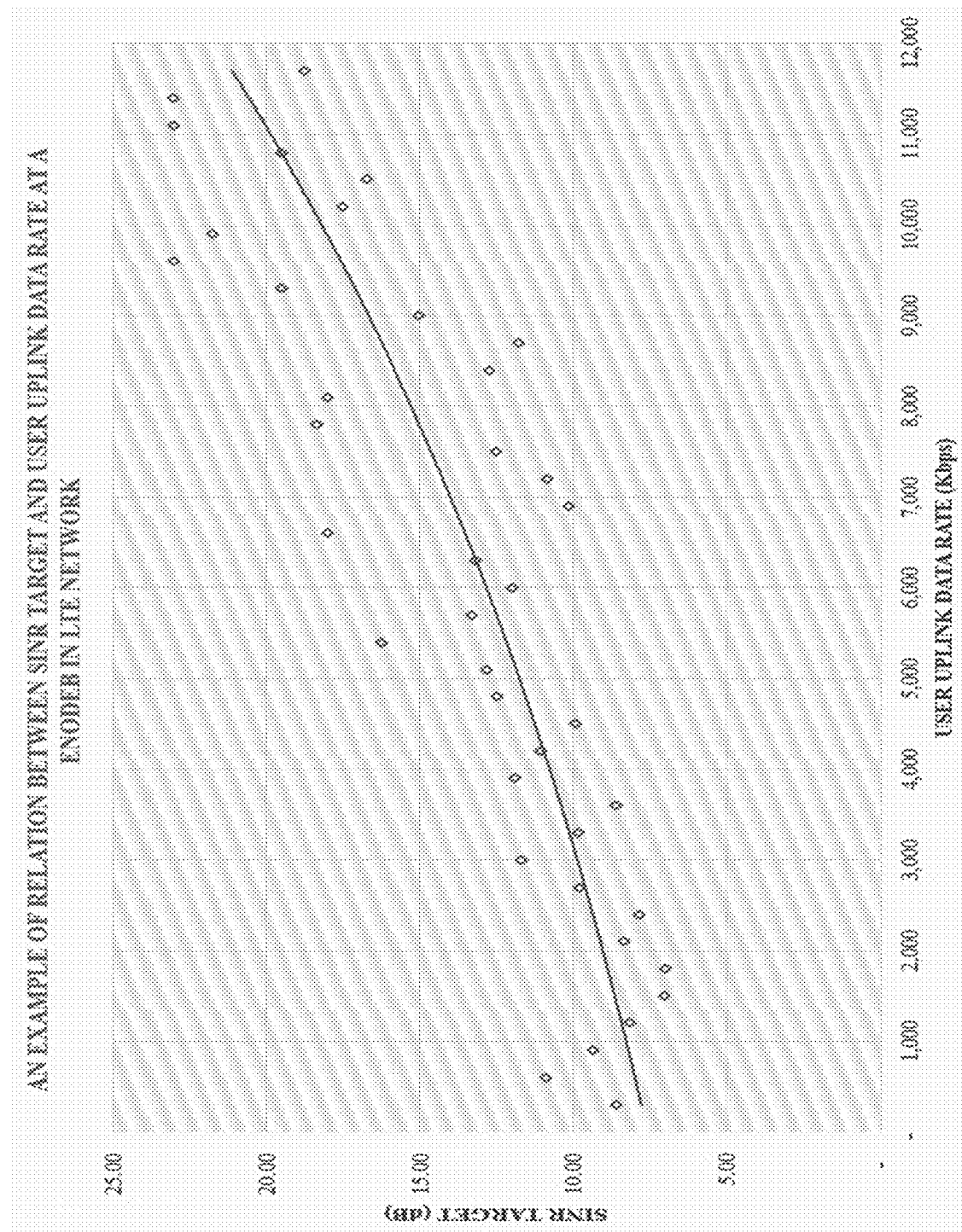
FIG. 3 illustrates the example results for the disclosed closed loop power control system in a LTE base station: $SINR_{target}$ is dynamically adjusted following Uplink data rates.

Furthermore, to evaluate the efficiency of the invention, FIG. 3 illustrates an example of results from the proposed Closed loop power control system implemented in a LTE base station: $SINR_{target}$ is dynamically adjusted following Uplink data rates. The $SINR_{target}$ and UE Uplink data rates are sampled and averaged by monitoring over a long-time duration. The results illustrates on the graph: in the same radio condition $SINR_{target}$ is dynamically changed adapting to Uplink data rates; the more increasing $SINR_{target}$ the more increasing Uplink data rates and vice versa.

What is claimed is:

1. A method of Closed loop power control comprising dynamically adjusting a target signal-to-interference and noise ratio ($SINR_{target}$) adapting to data rate change of each of a user equipment (UE), comprising the steps of: choosing Uplink channel information including an average signal-to-interference and noise ratio ($SINR_{average}$), Power headroom report (PHR), and Buffer status report (BSR) as the inputs for $SINR_{target}$ determination.

2. The method of claim 1, wherein an average Uplink data rate ($THP_{avg}$) is calculated in a predefined periodicity which is equal to UE's PHR periodicity, where $THP_{avg}$ is determined by the formula:

$$THP_{avg} = \frac{\text{Total Uplink data volumes in the recent PHR period}}{\text{Time to transfer}}$$

Where:

Time to transfer=Time of a PHR periodicity.

3. The method of claim 1, wherein UE data services is classified based on Uplink data rate $THP_{avg}$, Where $$THP_{avg} = \frac{\text{Total Uplink data volumes in the recent PHR period}}{\text{Time to transfer}}$$

Where:

Time to transfer=Time of a PHR periodicity.

4. The method of claim 3, comprising two types of UE data services:

UEs use low data rate service such as web service, over the top (OTT) apps, ping services and some data feedback for Uplink data transfer; and UEs use high data rate service such as video streaming and data Upload.

5. The method of claim 1, wherein $SINR_{target}$ for each UE Uplink connection is determined by two processes:

The first process: $SINR_{target}$ for UE requiring low data rate $SINR_{discrete}$ is defined by a formula (2):

$$SINR_{discrete} = SINR_{OLPC} \qquad (2)$$

Where:

$SINR_{OLPC}$ is average SINR when Base Station (BS) uses Open loop power control (OLPC), The second process: $SINR_{target}$ for UE requiring high data rate ($SINR_{highThp}$) is defined by the following steps:

Step 1: Prepare inputs including PHR, BSR and $SINR_{average}$;

Step 2: $SINR_{highThp}$ must be ensured by the equation (3):

$$SINR_{min} \leq SINR_{highThp}(i) \leq SINR_{max} \qquad (3)$$

Where:

$SINR_{min}$ is minimum SINR required that Base Station decodes successful Uplink signal, $SINR_{max}$ is maximum SINR that can be obtained by formula $SINR_{max}=SINR_{avg}+PHR$;

Step 3: Calculate $SINR_{highThp}$ based on the following algorithm:

$SINR_{highThp}\text{init}=SINR_{min}$,

Increase $SINR_{highThp}$ by $\Delta_{SINR}$ step from $SINR_{min}$ to $SINR_{max}$ $SINR_{highThp}(i)=SINR_{highThp}(i-1)+\Delta_{SINR}$, Where $\Delta_{SINR}$ is one step to increase efficient channel (AMC algorithm), Using PHR, BSR, $SINR_{highThp}(i)$ to estimate data rates at each step, Choosing $SINR_{highThp}$ at the step with the highest data rates.

* * * * *